United States Patent
Crowley et al.

(10) Patent No.: US 9,677,348 B2
(45) Date of Patent: Jun. 13, 2017

(54) VALVE FOR A DOWNHOLE TOOL

(75) Inventors: Daniel Brendan Crowley, Tewkesbury (GB); Robert Donald John Sedgeman, Tewkesbury (GB)

(73) Assignee: SMART STABILIZER SYSTEMS LIMITED, Tewkesbury (GB)

( * ) Notice: Subject to any disclaimer, the term of this patent is extended or adjusted under 35 U.S.C. 154(b) by 540 days.

(21) Appl. No.: 13/586,381

(22) Filed: Aug. 15, 2012

(65) Prior Publication Data
US 2013/0043032 A1    Feb. 21, 2013

(30) Foreign Application Priority Data
Aug. 19, 2011 (GB) .................................. 1114286.6

(51) Int. Cl.
| | | |
|---|---|---|
| E21B 17/10 | (2006.01) | |
| E21B 34/10 | (2006.01) | |
| E21B 34/06 | (2006.01) | |
| E21B 7/06 | (2006.01) | |
| F16K 31/524 | (2006.01) | |
| F16K 11/16 | (2006.01) | |

(52) U.S. Cl.
CPC .......... *E21B 17/1014* (2013.01); *E21B 7/062* (2013.01); *E21B 17/1021* (2013.01); *E21B 34/06* (2013.01); *E21B 34/101* (2013.01); *F16K 11/163* (2013.01); *F16K 31/52425* (2013.01)

(58) Field of Classification Search
CPC .. E21B 23/04; E21B 17/1014; E21B 17/1021; E21B 7/06; E21B 7/062; E21B 7/065; E21B 34/06; E21B 34/101
USPC ................................. 251/251, 257, 260–263
See application file for complete search history.

(56) References Cited

U.S. PATENT DOCUMENTS

| | | | | |
|---|---|---|---|---|
| 3,161,137 A | * | 12/1964 | Thoma et al. ................ | 417/307 |
| 3,511,266 A | * | 5/1970 | Phlipot ...................... | 137/484.4 |
| 3,558,245 A | * | 1/1971 | Bolduc ......................... | 418/61.3 |
| 4,902,208 A | * | 2/1990 | Wood ............................ | 417/462 |
| 5,186,393 A | * | 2/1993 | Yie ......................... | B05B 1/306 |
| | | | | 137/509 |
| 5,879,137 A | * | 3/1999 | Yie ......................... | F04B 1/124 |
| | | | | 137/624.13 |

(Continued)

FOREIGN PATENT DOCUMENTS

EP     1024245 A2    8/2000

*Primary Examiner* — David Andrews
*Assistant Examiner* — Tara Schimpf
(74) *Attorney, Agent, or Firm* — Blank Rome LLP

(57) ABSTRACT

A commutating valve for a downhole steering tool. The downhole steering tool has a sleeve which surrounds an annular body which in turn surrounds a driveshaft. A plurality of steering cylinders are located in the annular body and a steering piston is located in each steering cylinder, the steering pistons engaging the sleeve. A pump pressurizes hydraulic fluid within a reservoir, the reservoir having a closable outlet whereby the pressure of the hydraulic fluid within the reservoir can be raised by closing the outlet and lowered by opening the outlet. The valve comprises a number of discrete valve members which are all in communication with the reservoir and can be opened sequentially whereby to deliver hydraulic fluid to the steering cylinders sequentially. The pressure within each steering cylinder can be controlled in order to control the position of the driveshaft within the sleeve.

29 Claims, 2 Drawing Sheets

(56) References Cited

U.S. PATENT DOCUMENTS 7,878,272 B2 * 2/2011 Eppink ............... 175/325.1
2004/0036050 A1 * 2/2004 Kerg et al. ............. 251/263

* cited by examiner

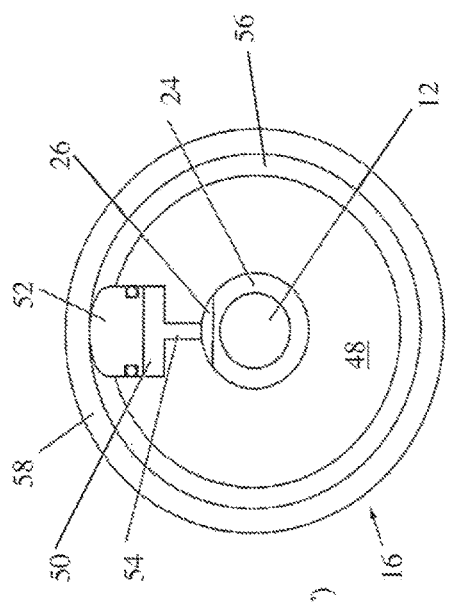
Fig.1
(PRIOR ART)
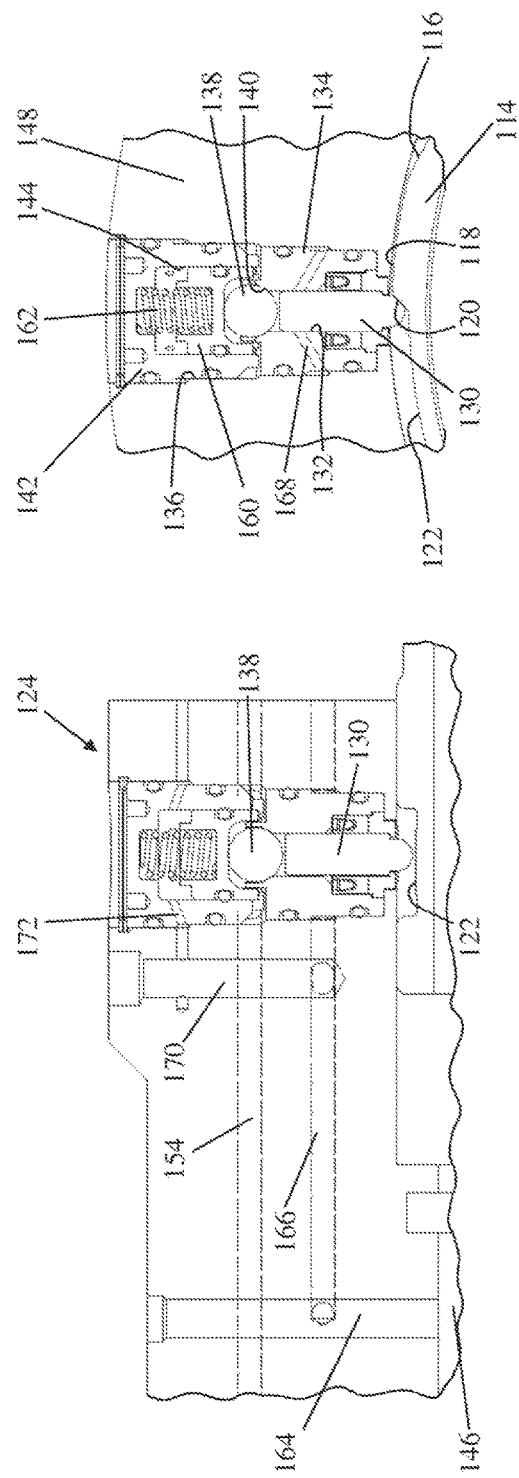
Fig.2
Fig.3

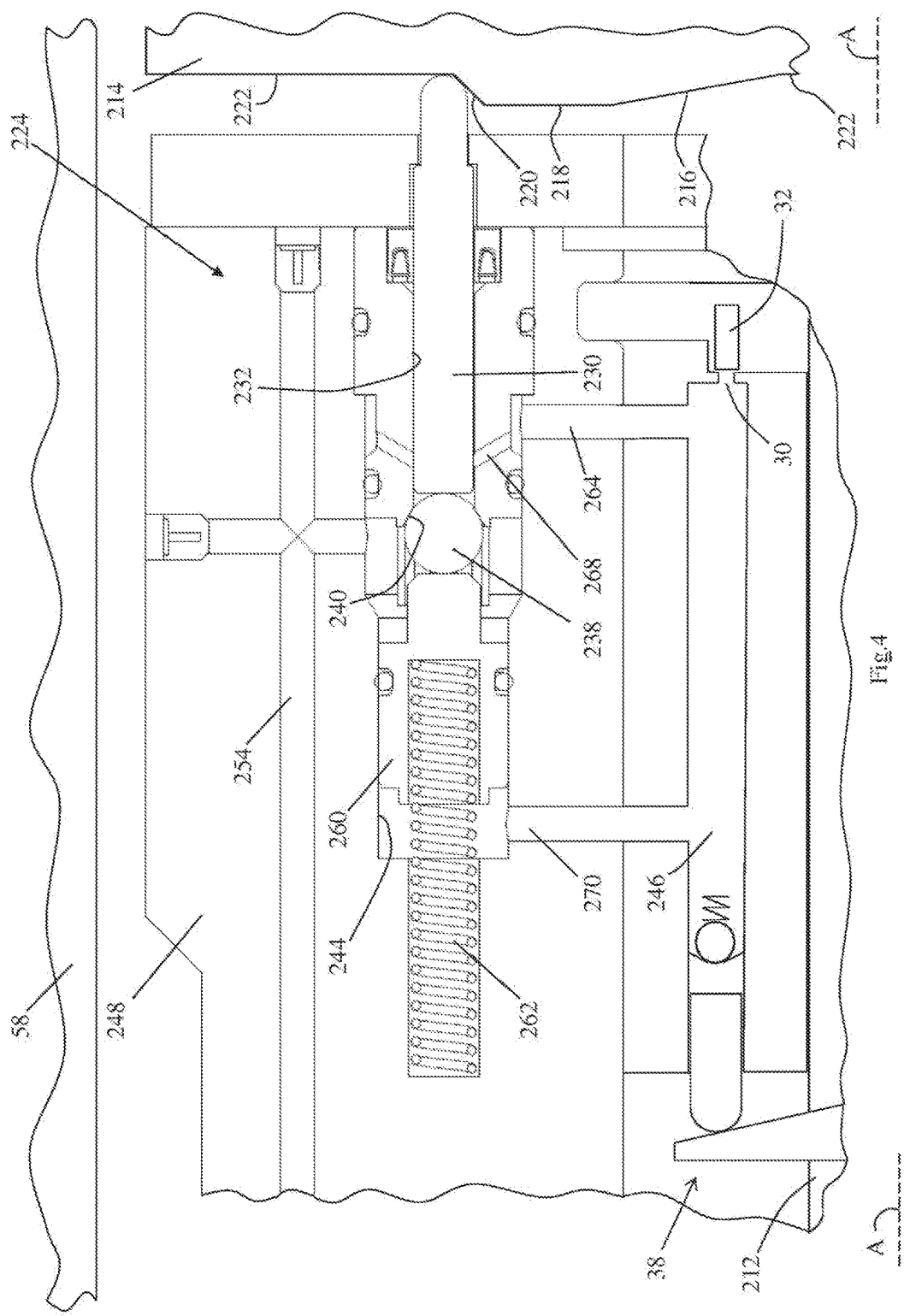

VALVE FOR A DOWNHOLE TOOL

CROSS REFERENCE TO RELATED APPLICATIONS

This Application claims priority to United Kingdom Patent Application No. GB1114286.6 filed Aug. 19, 2011, the contents of which are incorporated herein by reference.

FIELD OF THE INVENTION

This invention relates to valve for a downhole tool, and in particular to a commutating valve for use in a downhole steering tool such as that of EP 1 024 245.

BACKGROUND OF THE INVENTION

A downhole steering tool (or "controllable stabiliser") is described in EP 1 024 245. As indicated in that document, the steering tool is used to control the drilling direction by forcing a part of the driveshaft away from the longitudinal centreline of the borehole, thereby forcing the drill bit to deviate from a linear path.

The steering tool comprises a number of steering pistons located in respective steering cylinders spaced around the circumference of the steering tool, the steering cylinders being individually pressurised whereby the steering pistons to opposed sides of the steering tool can project from their steering cylinders by differing and controllable distances. The pressure of the fluid within each steering cylinder, and therefore the projection of each steering piston, is controlled by a commutating valve which delivers hydraulic fluid to each of the steering cylinders in turn, the pressure delivered to each steering cylinder being determined in accordance with the desired steering piston projection.

The present invention relates to a valve which is designed primarily to replace the commutating valve described in EP 1 024 245 The teaching of that document is incorporated into this document by reference so as to avoid the unnecessary repetition of much of the common componentry and method of operation. Whilst much of the following description therefore relates to the invention incorporated as a commutating valve in a downhole steering tool, it will be understood that the invention could be used on other downhole applications.

FIG. 4 of EP 1 024 245 is reproduced as FIG. 1 herein for ease of reference. The steering tool (16) surrounds a part of the driveshaft (12). The driveshaft (12) is connected to the drill string and the drill bit, neither of which is shown in FIG. 1, in known fashion. The steering tool (16) comprises a body (48) and a sleeve (58), the body (48) and sleeve (58) being separated by a fluid-filled annulus (56). Formed in the body (48) are six steering cylinders (50), each of which carries a steering piston (52), only one of the steering cylinders and steering pistons being shown in FIG. 1 (the other five steering cylinders and steering pistons are identical to the steering cylinder and steering piston shown in FIG. 1, and spaced at 60° intervals around the body (48)). In use, the driveshaft (12) will rotate and the body (48) will be substantially non-rotating, i.e. the body (48) will be held substantially rotationally stationary by the engagement of the sleeve (58) with the surrounding borehole wall. Whilst an arrangement having six steering cylinders (50) is described in EP 1 024 245, practical embodiments of that invention have twelve steering cylinders spaced at 30° intervals around the body. It will be understood that the present invention can be used with any number of steering cylinders.

The steering tool (16) has an annular reservoir of pressurised hydraulic fluid which is not seen in FIG. 1, the reservoir being connected to a channel (26) located in an annular commutating valve (24). Importantly, the commutating valve (24) is fixed to rotate with the driveshaft (12) and therefore rotates relative to the body (48), so that as the driveshaft (12) and commutating valve (24) rotate the channel (26) periodically communicates with each of the steering cylinders (50) by way of its respective conduit (54).

A solenoid valve (not seen in FIG. 1) can be opened to relieve the pressure within the channel (26). As long as the solenoid valve remains open all of the steering cylinders (50) experience the same pressure and the body (48) (and therefore the driveshaft (12)) remains centrally located relative to the sleeve (58) and borehole. To cause the driveshaft (12) to move away from its central location the solenoid valve is closed whilst the channel (26) is in communication with a chosen steering cylinder (50), that steering cylinder receiving higher-pressure hydraulic fluid which causes the respective piston (52) to be driven outwardly.

It is essential to the correct operation of the commutating valve (24) that the higher-pressure hydraulic fluid is only delivered to the chosen steering cylinder (or chosen adjacent steering cylinders), and this requires a fluid-tight seal to be present between the commutating valve (24) and the body (48). The seal between these components, both in FIG. 1 and in practical embodiments of the steering tool, is provided by the accurate machining of the sliding metal surfaces.

In practice, the steering tool (16) experiences significant temperature variations in use, and the thermal expansion of the commutating valve (24) and body (48) prevent the maintenance of a perfect seal. In practical embodiments the adverse effects of the less than perfect seal are sought to be overcome by using a more viscous hydraulic fluid. However, there is a limit to the viscosity which can be used since the solenoid valve must operate with the hydraulic fluid, and if the hydraulic fluid is too viscous the solenoid valve will not be able to close. Whilst a spring can be used to assist closure of the solenoid valve the force provided by the spring must be somewhat less than the electromotive (valve opening) force which can be provided by the solenoid, so that in practice a strong spring cannot be used to assist valve closure.

Also, a given steering tool is likely to have to operate in different temperature regimes, i.e. the temperature varies according to the depth and location of the borehole in which the steering tool is being used, and a high viscosity hydraulic fluid suitable for use in a high temperature borehole might be too viscous in a low temperature borehole, resulting in significant pumping losses and perhaps leading to tool failure in the event that the solenoid valve cannot close. Alternatively, a low viscosity hydraulic fluid suitable for a low temperature borehole is likely to leak between the commutating valve (24) and the body (48) when used in a high temperature borehole, again perhaps leading to tool failure.

SUMMARY OF THE INVENTION

Despite the significant benefits of the steering tool of EP 1 024 245, the inventor has realised that there is a need for an improved valve for use as a commutating valve which reduces the likelihood of tool failure and therefore increases the applicability of the steering tool, and allows its use across a wider range of temperatures. An object of the present invention is therefore to provide a valve which is less vulnerable to leakage. Such a valve can be used with a less viscous hydraulic fluid, enabling a reduction in pumping losses, the use of a lower powered solenoid valve, the use of less robust componentry, and can result in a longer expected working life for the solenoid valve and other componentry.

According to the invention, there is provided a valve for a downhole tool, the valve comprising a plurality of discrete valve members and an actuator, the actuator being adapted to open the valve members sequentially. The valve therefore comprises an assembly of discrete valve members, and can be configured as a commutating valve.

The single sliding seal between the valve (24) and the body (48) in the commutating valve of EP 1 024 245 is therefore replaced by a number of discrete valve members, each valve member being able to vary the rate of flow of hydraulic fluid. Ideally, each valve member is able to permit or prevent the passage of hydraulic fluid, i.e. each valve member has an "open" and a "closed" condition.

Whilst the valve has been designed for use primarily with a steering tool, and in particular the steering tool of EP 1 024 245, it is not limited to that tool and may be used in other steering tools utilising a commutating valve, as well as in other valve applications as indicated above.

Preferably, each valve member is a ball locatable upon a seat. Ball valves are known to be very reliable and substantially leak-free, and are suited to two-position (open or closed) operation.

Desirably, the valve member is engaged by a valve piston, the valve piston being movable within a valve cylinder it is desirably arranged that the valve piston engages the valve member and can drive the valve member to its closed position.

Preferably, the valve cylinder, at its end opposed to the valve member, has an inlet for hydraulic fluid. It can thereby be arranged that hydraulic fluid, at substantially the same pressure, is delivered to both sides of the valve piston when the valve member is open. The force exerted by the hydraulic fluid can therefore be balanced to both sides of the valve piston, permitting the valve piston to be moved to close the valve member by a relatively small closing force. The closing force is ideally provided by a resilient biasing means, ideally a compression spring.

Desirably, the actuator communicates with the valve member by way of a movable plunger, the plunger being movable in a bore within the body of the tool. The bore preferably terminates at the valve seat. Desirably, the bore has at least one inlet for hydraulic fluid. When the valve member is open the hydraulic fluid can flow from the bore, past the valve member and into the valve cylinder below the valve piston.

In use as a commutating valve of a steering tool such as EP 1 024 245, each valve cylinder of the commutating valve has an outlet at its end adjacent to the valve member, the outlet communicating hydraulic fluid to an individual steering cylinder (50). Accordingly, when the solenoid valve is closed pressurised hydraulic fluid can be delivered through a chosen commutating valve cylinder to a chosen steering cylinder (50).

There is also provided a steering tool for a drillstring, the steering tool having an annular body adapted to surround a part of the drillstring and a sleeve adapted to surround the body, the steering tool having a plurality of steering cylinders formed in the body and a respective steering piston located in each steering cylinder, the steering tool carrying a volume of hydraulic fluid and having a hydraulic pump adapted to pump hydraulic fluid into a reservoir, the reservoir having a closable outlet whereby the pressure within the reservoir can be raised when the outlet is closed and lowered when the outlet is opened, a commutating valve in communication with the reservoir and adapted to deliver hydraulic fluid to the steering cylinders sequentially, the commutating valve comprising a number of discrete valve members and an actuator, the actuator being adapted to open the valve members sequentially.

Preferably the reservoir outlet is closed by a solenoid valve.

BRIEF DESCRIPTION OF DRAWINGS

The invention will now be described in more detail, by way of example, with reference to the accompanying drawings, in which:

FIG. 1 reproduces FIG. 4 of EP 1 024 245;

FIG. 2 shows a longitudinal cross section through a part of a steering tool having a valve according to the present invention arranged as a commutating valve;

FIG. 3 shows a transverse cross section of the part of the steering tool of FIG. 2; and FIG. 4 shows a longitudinal cross section through a part of a steering tool having an alternative design of valve according to the present invention arranged as a commutating valve.

DETAILED DESCRIPTION OF DRAWINGS

A description of the relevant parts of the prior art arrangement of FIG. 1 is set out above and will not be repeated.

The valve assembly or commutating valve 124 of FIGS. 2 and 3, and the valve assembly or commutating valve 224 of FIG. 4, have been designed to replace the commutating valve 24 and channel 26 of the steering tool described in EP 1 024 245, and thereby provide an alternative means of delivering pressurised hydraulic fluid to the steering cylinders 50. As with the commutating valve 24 described in EP 1 024 245, the commutating valve 124, 224 is adapted to interconnect a reservoir 146 of hydraulic fluid (see also the reservoir 246 of FIG. 4) with the respective steering cylinders 50 once for each rotation of the drill string 12.

The pressure of the hydraulic fluid within the reservoir can be varied, preferably by way of a pump (see the pump 38 of FIG. 4) which pumps hydraulic fluid into the reservoir 146, 246 and a solenoid valve 32 which can allow the escape of hydraulic fluid from the reservoir by way of a closable outlet 30. As in EP 1 024 245 the pump 38 is operated continuously and the solenoid valve 32 is operated intermittently, the pump and solenoid valve together determining the pressure of the hydraulic fluid which is communicated to the steering cylinders 50. If the solenoid valve 32 is open the hydraulic fluid within the reservoir 146, 246 is at a low pressure and if the solenoid valve 32 is closed the hydraulic fluid within the reservoir is at a high pressure. Whilst alternative means for selectively varying the pressure of the hydraulic fluid can be provided, and can be used with the present invention, it is preferred to use a similar arrangement to that described in EP 1 024 245, as is shown in FIG. 4.

The delivery of high pressure hydraulic fluid to a particular steering cylinder 50 (or to particular adjacent steering cylinders) causes the respective piston(s) 52 to be moved outwardly in order to deviate the driveshaft 12, as described above.

As is common in downhole steering tools, the steering componentry is located within a chamber which is filled with hydraulic fluid. In known fashion, the pressure of the hydraulic fluid within the tool is firstly matched (for example by way of a pressure-balancing piston) to that of the surrounding borehole whereby to minimise the likelihood of leaks. Secondly, a hydraulic pump 38 is provided whereby to raise the pressure of the hydraulic fluid in certain (high pressure) parts of the tool. The hydraulic pump of the embodiment of FIGS. 2 and 3 may be similar to that shown in FIG. 4, which is itself similar to that of FIG. 3 of EP 1 024 245 and referred to by the numeral 38. In EP 1 024 245 the hydraulic pump can raise the pressure of the hydraulic fluid within the reservoir and the channel 26 whenever the solenoid valve is closed. When the solenoid valve 32 is opened the pressure within the reservoir 146, 246 and channel 26 is relieved to a pressure substantially the same as the (lower) pressure within the remainder of the tool. The solenoid valve therefore determines whether the reservoir contains hydraulic fluid at a relatively high pressure or at a relatively low pressure, the actual pressures being determined by the conditions of use.

The commutating valve 124 of FIGS. 2 and 3 utilises a reservoir 146. As above described, the pressure of the hydraulic fluid within the reservoir 146 is preferably controlled by a pump and solenoid valve similar to those of FIG. 4 and EP 1 024 245. It will be understood that the pump (not shown in FIG. 2 or 3) acts continuously to increase the pressure within the reservoir 146, whilst the solenoid valve (also not shown in FIG. 2 or 3) acts intermittently to permit or prevent the escape of hydraulic fluid from the reservoir 146. It is arranged that the open solenoid valve can permit hydraulic fluid to flow out of the reservoir 146 at a greater rate than it is being introduced by the pump, so that when the solenoid valve is open the pressure within the reservoir is reduced to substantially that of the surrounding borehole.

The steering tool includes an actuator, in this embodiment a rotary actuator 114 which is connected directly to the driveshaft (not shown in FIG. 2 or 3, but see the driveshaft 212 of FIG. 4) and rotates with the driveshaft. As shown in FIG. 3, the actuator 114 includes a first cammed section 116, a large-diameter section 118, a second cammed section 120 and a small-diameter section 122. The small-diameter section 122 runs from the second cammed section 120 to the first cammed section 116 so that there is only a single large-diameter section 118 upon the circumference of the actuator 114.

The actuator 114 engages a plunger 130. The plunger 130 is mounted within a bore 132 of an insert 134 which is fixed into a drilled opening 136 in the body 148 of the tool. The body 148 does not rotate with the driveshaft so that the actuator 114 rotates relative to the plunger 130. As the actuator 114 rotates (clockwise as drawn in FIG. 3), once in each revolution the plunger 130 will engage the first cammed section 116 and the large-diameter section 118 and the plunger will be moved (upwards as drawn) from the position shown.

The end of the plunger 130 opposed to the actuator 114 engages a ball 138. Whilst the plunger 130 is in engagement with the small-diameter section 122 of the actuator 114 the ball 138 rests upon its seat 140; however, when the plunger 130 is moved by the first cammed section 116 the ball 138 is lifted from its seat 140. The ball 138 is held away from its seat 140 by the plunger 130 whilst the plunger engages the large-diameter section 118 of the actuator 114, so that the circumferential length of the large-diameter section 118 determines the duration for which the valve member 138, 140 is held open.

Only one valve member 138, 140 is shown in FIGS. 2 and 3, but (similarly to FIG. 1) it will be understood that there is a plurality of valve members in the commutating valve 124 (one for each of the steering cylinders 50) located circumferentially around the body 148. In embodiments having six steering cylinders 50 the commutating valve 124 has six valve members 138,140 spaced at approximately 60° intervals around the body 148, and the first cammed section 116 and the large-diameter section 118 will engage the plunger 130 of each of the valve members sequentially.

Importantly, the combined circumferential length of the first cammed section 116, the raised section 118 and the second cammed section 120 is no greater than (and is preferably less than) the distance between the plungers 130 of adjacent valve members 138, 140, so that each valve member is closed before the next valve member is opened. Accordingly, only one of the valve members 138, 140 is open at a time, so that hydraulic fluid can be delivered to individual steering cylinders 50 as desired.

Regardless of the pressure of the hydraulic fluid within the reservoir 146, each of the valves members 138, 140 will therefore open once for each revolution of the driveshaft 12 and actuator 114.

The drilled opening 136 includes a second insert 142 which defines a valve cylinder 144 and carries a movable valve piston 160. The valve piston 160 engages the ball 138 and is therefore moved (upwardly as drawn) from the position shown in FIGS. 2 and 3 as the ball 138 is lifted from its seat 140. The valve piston 160 is biased towards the (valve closed) position by a compression spring 162, so that the compression spring 162 serves to close the valve member 138, 140.

The body 148 has conduits formed therethrough for communicating hydraulic fluid to and from the commutating valve 124. A first set of conduits 164, 166 connect the reservoir 146 to passageways 168 within the first insert 134, the first set of conduits 164, 166 and the passageways 168 thereby permitting hydraulic fluid to enter the bore 132 underneath the valve seat 140. It will be understood that whilst FIG. 3 does not show any clearance around the plunger 130, clearance for the passage of hydraulic fluid is provided above the passageways 168.

A branch 170 off the conduit 166, and passageways 172 through the second insert 142, connect the reservoir 146 with the cylinder 144 above the valve piston 160 (i.e. to the side of the valve piston 160 opposed to the ball 138).

A second conduit 154 communicates with the drilled opening 136 between the first insert 134 and the second insert 142, so that the second conduit is connected to the outlet of the valve member 138, 140. Accordingly, when the ball 138 is lifted from its seat 140, hydraulic fluid is communicated from the passageways 168, along the bore 132 around the plunger 130, past the ball 138 and into the second conduit 154. It will be understood that the second conduit 154 delivers hydraulic fluid to a particular steering cylinder 50, so that when the valve member 138, 140 is open the reservoir 146 is connected to the steering cylinder 50 of that valve member. In the event that the solenoid valve is closed and the pressure within the reservoir 146 is at the higher pressure, the steering piston 52 will be driven outwardly to deviate the drillstring.

It will be understood that when the valve member 138, 140 is open, substantially the same hydraulic pressure acts to both sides of the valve piston 160, regardless of the actual pressure within the reservoir 146. Since the areas of each side of the valve piston 160 are the same, the hydraulic forces acting upon the valve piston are balanced. As soon as the plunger 130 passes the second cammed section 120 of the actuator 114 and is no longer holding the ball 138 off its seat 140, the spring 162 can drive the ball 138 onto its seat 140 whereby to close the valve member.

It will also be understood that the area of the valve piston 160 is greater than the area of the bore 132, so that, when the valve member 138, 140 is closed the hydraulic force upon the valve piston is greater than the hydraulic force upon the ball 140, holding the valve member shut.

It will be appreciated that there is only a small radial distance between the driveshaft 12 and the periphery of the body 148 in which to locate the commutating valve 124, but because of the balanced hydraulic forces upon the valve piston 160 the spring 162 does not need to be large and a suitable spring can be fitted into the space available.

In the alternative embodiment of FIG. 4, the valve members 238, 240 are located longitudinally rather than radially, but the operation of the commutating valve 224, and the operation of the steering tool, are similar. Accordingly, in the embodiment of FIG. 4 the plunger 230 and the ball 238 move parallel to the longitudinal axis A-A of the steering tool, rather than perpendicular to the longitudinal axis as in the embodiment of FIGS. 2 and 3.

Again, only one of the valve members 238, 240 is shown in FIG. 4, but it will be understood that the commutating valve 224 comprises a plurality of valve members spaced circumferentially around the body 248 of the steering tool, with one valve member 238,240 for each steering cylinder 50.

The steering tool of FIG. 4 has a rotary actuator 214 which is connected directly to the driveshaft 212 and rotates with the driveshaft 212. The actuator 214 includes a first sloping section 216, a raised section 218, a second sloping section 220 and a planar section 222. The planar section 222 runs from the second sloping section 220 to the first sloping section 216 so that there is only a single raised section 218 upon the surface of the actuator 214.

As the actuator 214 rotates around the longitudinal axis A-A, it moves past the plunger 230 in a downwards direction as drawn. The first sloping section 216 pushes the plunger 230 to the left as drawn, moving the ball 238 off its seat 240. Hydraulic fluid is communicated from the reservoir 246, along the first conduit 264, through the passageways 268 and bore 232, past the ball 238 and along the second conduit 254 to a respective steering cylinder 50. The length of the raised section 218 determines the duration for which the valve member 238, 240 is held open.

As in the embodiment of FIGS. 2 and 3, the hydraulic forces acting upon the valve piston 260 are balanced by virtue of a conduit 270 which communicates hydraulic fluid from the reservoir 246 to the end of the cylinder 244 opposed to the ball 238. Thus, notwithstanding that there is more (longitudinal) space available in this embodiment in which to locate the valve closing spring 262, the force exerted by the spring 262 need not be large.

It will be understood that in the embodiment of FIGS. 2 and 3, one drilled opening 136, with its valve member 138,140 and other componentry, is provided for each of the steering cylinders 50. In the event that the steering tool has six steering cylinders 50, it is expected that there is sufficient room within the body 148 to locate six drilled openings 136 in the same plane (at 60° intervals around the body 148). If, however, there are more steering cylinders 50, for example twelve steering cylinders, there may not be sufficient room to locate twelve drilled openings 136 in the same longitudinal plane. In such a case, the commutating valve 124 can comprise two (or more) banks of drilled openings 136, the respective banks being separated along the longitudinal axis A-A of the steering tool. There may for example be six drilled openings 136 lying in a first plane at one longitudinal position, and six drilled openings 136 lying in a second plane at another longitudinal position, the respective drilled openings in the first plane preferably being offset from those in the second plane (for example by 30°) so as to facilitate communication of hydraulic fluid to and from all of the drilled openings 136.

Similarly, for the valve member shown in FIG. 4, it is not necessary that all of the valve members 238, 240 be arranged at the same radius if space is a concern. For example, four valve members 238, 240 could be located at a first radial distance (close to the driveshaft), and eight valve members 238, 240 could be located at a second radial distance (farther from the driveshaft). The rotary actuator 214 could have a first raised section at the first radial distance and a second raised section at the second radial distance. Despite their location at different radial positions, it would preferably be arranged that the valve members lie at 30° intervals around the body 248. Also, the length of the first raised section should be shorter than the length of the second raised section so that all of the respective valves 238, 240 are held open for the same period of time.

The cammed portions 116 and 120 of FIG. 3, and the sloping portions 216 and 220 of FIG. 4, are shown to be substantially linear, but they can be curved if desired (and rounded where they meet the adjacent actuator portions). The inclination of the first cammed portion 116 is smaller than the inclination of the second cammed portion 120 (and similarly for the first and second sloping portions 216, 220) so that the rate at which the plunger 130, 230 is moved to open the valve member is slower than the rate of movement to close the valve member.

It will be understood that the inclination of the second cammed portion 120, and the inclination of the second sloping portion 220, may exceed the rate at which the valve member can close, i.e. the inclination may exceed the rate at which the respective spring 162, 262 can force the ball 138, 238 against its seat 140, 240, in which case the plunger may be temporarily disengaged from the actuator. It is desired, however, that the angle of inclination of the second cammed portion 120, and the angle of inclination of the second sloping portion 220, are sufficiently shallow to maintain the engagement between the respective plunger 130, 230 and its actuator 114, 214.

The use of separate valve members, and in particular ball valves, enables the use of lower viscosity hydraulic fluid than is typically used in a steering tool of EP 1 024 245, even in higher temperature boreholes. The use of a lower viscosity hydraulic fluid in turn leads to reduced pumping losses, enables the use of a lower powered solenoid valve and results in a longer expected working life for the solenoid valve.

What is claimed is:

1. A valve for a downhole tool, the valve comprising:
a plurality of discrete valve members and an actuator, each valve member being located in a respective valve chamber,
the valve having a reservoir of hydraulic fluid,
each valve member comprising a valve element and a valve seat, the valve element being movable within the valve chamber and being engagable with the valve seat, each valve member having a closed condition in which the valve element engages the valve seat and an open condition in which the valve element does not engage the valve seat, the valve element having a larger cross-sectional area than the valve seat, the valve element being engaged by a valve piston which is movable relative to the valve seat within a valve cylinder in the valve chamber, each valve chamber having a first inlet for hydraulic fluid, the first inlet being connected to the reservoir by a first fluid conduit, the valve seat being between the first inlet and the valve cylinder, each valve chamber having a second inlet for hydraulic fluid, the second inlet being connected to the reservoir by a second fluid conduit, the valve piston being between the second inlet and the valve seat, the actuator being adapted to move the valve members to their open conditions sequentially.

2. The valve according to claim 1 in which only one of the valve members is in its open condition at a time.

3. The valve according to claim 1 in which the valve piston is biased towards the valve seat.

4. The valve according to claim 1 in which each of the plurality of discrete valve members is moved to its open condition by way of a respective plunger which engages the actuator, the plunger being movably located within a bore in the valve chamber, the cross-sectional area of the valve piston being greater than the cross-sectional area of the bore.

5. The valve according to claim 4 in which the bore is located in a first insert fixed in the valve chamber, and in which a part of the first fluid conduit comprises passageways in the first insert.

6. The valve according to claim 1 in which the valve chambers are located in an annular body.

7. The valve according to claim 6 in which the annular body surrounds a driveshaft, and in which the actuator is mounted upon the driveshaft.

8. A The valve according to claim 1 in which each valve element comprises a ball.

9. The valve according to claim 1 in which the actuator has a large-diameter part and a small-diameter part, the large-diameter part and the small-diameter part being interconnected by a first cammed part and a second cammed part.

10. The valve according to claim 9 in which the first cammed part has a different angle of inclination than the second cammed part.

11. The valve according to claim 1 in which the actuator is generally substantially planar and has a raised section, the raised section being connected to a substantially planar section by a first sloping section and a second sloping section.

12. The valve according to claim 11 in which the first sloping section has a different angle of inclination than the second sloping section.

13. The valve according to claim 1 in which the downhole tool is a downhole steering tool.

14. The valve according to claim 1 in which the valve cylinder is located in a second insert mounted in the valve chamber, and in which a part of the second fluid conduit comprises passageways in the second insert.

15. A downhole steering tool having:
an annular body;
a driveshaft, part of the driveshaft being surrounded by the annular body;
a sleeve surrounding a part of the annular body;
a plurality of steering cylinders located in the annular body;
a respective steering piston located in each steering cylinder, the steering pistons engaging the sleeve;
a hydraulic pump;
a reservoir of hydraulic fluid, the hydraulic pump being adapted to pump hydraulic fluid into the reservoir, the reservoir having a closable outlet whereby the pressure of the hydraulic fluid within the reservoir can be raised by closing the outlet and lowered by opening the outlet;
a valve in communication with the reservoir and adapted to deliver hydraulic fluid to the steering cylinders sequentially, the valve comprising a plurality of discrete valve members, each valve member being located in a respective valve chamber, each valve member comprising a valve element and a valve seat, the valve element being movable within the valve chamber and being engagable with the valve seat, each valve member having a closed condition in which the valve element engages the valve seat and an open condition in which the valve element does not engage the valve seat, the valve element having a larger cross-sectional area than the valve seat, the valve element being engaged by a valve piston which is movable relative to the valve seat within a valve cylinder in the valve chamber, each valve chamber having a first inlet for hydraulic fluid, the first inlet being connected to the reservoir by a first fluid conduit, the valve seat being between the first inlet and the valve cylinder, each valve chamber having a second inlet for hydraulic fluid, the second inlet being connected to the reservoir by a second fluid conduit, the valve piston being between the second inlet and the valve seat; and an actuator adapted to move the valve members to their open conditions sequentially.

16. The downhole steering tool according to claim 15 in which only one of the valve members is in its open condition at a time.

17. The downhole steering tool according to claim 15 in which the valve piston is biased towards the valve seat.

18. The downhole steering tool according to claim 15 in which each valve member is moved to its open condition by way of a respective plunger which engages the actuator, the plunger being movably located within a bore in the valve chamber, the cross-sectional area of the valve piston being greater than the cross-sectional area of the bore.

19. The downhole steering tool according to claim 18 in which the bore is located in a first insert fixed in the valve chamber, and in which a part of the first fluid conduit comprises passageways in the first insert.

20. The downhole steering tool according to claim 15 in which the valve chambers are located in the annular body.

21. The downhole steering tool according to claim 15 in which the actuator is mounted upon the driveshaft.

22. The downhole steering tool according to claim 15 in which each valve element comprises a ball.

23. The downhole steering tool according to claim 15 in which the actuator has a large-diameter part and a small-diameter part, the large-diameter part and the small-diameter part being interconnected by a first cammed part and a second cammed part.

24. The downhole steering tool according to claim 23 in which the first cammed part has a different angle of inclination than the second cammed part.

25. The downhole steering tool according to claim 15 in which the actuator is generally substantially planar and has a raised section, the raised section being connected to a substantially planar section by a first sloping section and a second sloping section.

26. The downhole steering tool according to claim 25 in which the first sloping section has a different angle of inclination than the second sloping section.

27. The valve according to claim 1 in which the first and second inlets communicate substantially the same hydraulic pressure.

28. The downhole steering tool according to claim 15 in which the first and second inlets communicate substantially the same hydraulic pressure.

29. The downhole steering tool according to claim 15 in which the valve cylinder is located in a second insert mounted in the valve chamber, and in which a part of the second fluid conduit comprises passageways in the second insert.

\* \* \* \* \*